United States Patent
Teggatz et al.

(10) Patent No.: US 9,722,420 B2
(45) Date of Patent: Aug. 1, 2017

(54) ADAPTIVE POWER CONTROL FOR ENERGY HARVESTING

(71) Applicant: Triune IP LLC, Richardson, TX (US)

(72) Inventors: Ross E. Teggatz, McKinney, TX (US); Wayne T. Chen, Plano, TX (US); Brett Smith, Richardson, TX (US)

(73) Assignee: TRIUNE IP, LLC, Plano, TX (US)

( * ) Notice: Subject to any disclaimer, the term of this patent is extended or adjusted under 35 U.S.C. 154(b) by 0 days.

(21) Appl. No.: 13/874,321

(22) Filed: Apr. 30, 2013

(65) Prior Publication Data

US 2013/0241465 A1 Sep. 19, 2013

Related U.S. Application Data

(63) Continuation of application No. 12/757,989, filed on Apr. 10, 2010, now abandoned.

(60) Provisional application No. 61/168,542, filed on Apr. 10, 2009.

(51) Int. Cl.
*H02J 7/00* (2006.01)
*H02J 1/00* (2006.01)
*H02J 7/35* (2006.01)

(52) U.S. Cl.
CPC .............. *H02J 1/00* (2013.01); *H02J 7/0052* (2013.01); *H02J 7/0073* (2013.01); *H02J 7/35* (2013.01); *Y10T 307/359* (2015.04); *Y10T 307/658* (2015.04)

(58) Field of Classification Search
CPC ......... H02J 7/345; H02J 7/0016; H02J 7/0093
USPC ........... 320/101, 166; 307/109, 110; 363/17; 310/339
See application file for complete search history.

(56) References Cited

U.S. PATENT DOCUMENTS

| | | | |
|---|---|---|---|
| 6,384,579 B2 | 5/2002 | Watanabe | |
| 6,590,370 B1 * | 7/2003 | Leach | 323/299 |
| 7,081,693 B2 * | 7/2006 | Hamel et al. | 307/151 |
| 7,091,700 B2 | 8/2006 | Kadouchi et al. | |
| 2001/0033501 A1 * | 10/2001 | Nebrigic | 363/49 |
| 2003/0117822 A1 * | 6/2003 | Stamenic et al. | 363/132 |
| 2008/0238195 A1 * | 10/2008 | Shaver et al. | 307/18 |
| 2010/0173211 A1 * | 7/2010 | Kim | H01M 8/04582 429/432 |

* cited by examiner

*Primary Examiner* — Yalkew Fantu
(74) *Attorney, Agent, or Firm* — Jackson Walker LLP; Christopher J. Rourk

(57) ABSTRACT

Advances in the arts are disclosed with novel methods and circuit systems for controlling power in an energy harvesting system. Techniques and related systems for controlling power output of an energy harvesting device provide for monitoring at least one power parameter at a power source and monitoring at least one power parameter at a load such as a storage medium. The power source output is adjusted in order to optimize energy harvesting and/or storage based on real-time performance parameters.

19 Claims, 3 Drawing Sheets

IMPLEMENTATION FOR DUAL-STRING PANEL

IMPLEMENTATION FOR DUAL-STRING
PANEL

ADAPTIVE POWER CONTROL FOR ENERGY HARVESTING

PRIORITY ENTITLEMENT

This application is entitled to priority based on Provisional Patent Application Ser. No. 61/168,542 filed on Apr. 10, 2009, which is incorporated herein for all purposes by this reference. This application and the Provisional Patent Application have at least one common inventor.

TECHNICAL FIELD

The invention relates to electronic systems for the more efficient utilization of energy resources. More particularly, the invention relates to power control methods, systems, and circuitry designed to facilitate the harvesting of useable power from variable power energy sources such as photovoltaic systems.

BACKGROUND OF THE INVENTION

Systems for harvesting energy from renewable resources have long been desired in the arts. One of the problems associated with engineering energy harvesting systems is the challenge of making maximum use of energy sources which may be intermittent in availability and/or intensity. Solar power, for example, typically relies on solar cells, or photovoltaic (PV) cells, used to power electronic systems by charging storage elements such as batteries or capacitors, which then may be used to supply an electrical load. The sun does not always shine on the solar cells with equal intensity however, and such systems are required to operate at power levels that may vary depending on weather conditions, time of day, shadows from obstructions, and even shadows cast by birds passing overhead, causing solar cell power output to fluctuate. Similar problems with output variability are experienced with other power sources such as wind, piezoelectric, regenerative braking, hydro power, wave power, and so forth. It is common for energy harvesting systems to be designed to operate under the theoretical assumption that the energy source is capable of delivering at its maximum output level more-or-less all of the time. This theoretical assumption is rarely matched in practice.

Due to the foregoing and other problems and potential advantages, improved methods, systems, and/or apparatus for power control in energy harvesting systems, such as solar power systems for example, would be a useful contribution to the arts.

SUMMARY OF THE INVENTION

In carrying out the principles of the present invention, in accordance with preferred embodiments, the invention provides advances in the arts with useful and novel control systems and methods for efficiently harvesting electrical power from energy sources which may be intermittent in terms of availability and/or intensity. Preferred embodiments described herein include solar energy harvesting applications as examples of implementations of the invention. These embodiments are intended to be exemplary and not exclusive. Variations in the practice of the invention are possible and preferred embodiments are illustrated and described. All possible variations within the scope of the invention cannot, and need not, be shown.

According to one aspect of the invention, a preferred embodiment of a method for controlling power in an energy harvesting system includes the steps of monitoring at least one power parameter at a power source and monitoring at least one power parameter at a load. In a further step, power source output is increased responsive to a lower monitored power source parameter threshold. Power source output is increased responsive to an upper monitored power source parameter threshold.

According to another aspect of the invention, a preferred embodiment of a method for controlling power in an energy harvesting system includes the further step of combining the outputs of a plurality of power sources.

According to another aspect of the invention, an example of a preferred embodiment of a method for controlling power in an energy harvesting system also includes steps for providing a plurality of regulator circuits, each for independently regulating one or more power sources responsive to one or more monitored parameters.

According to another aspect of the invention, in a preferred embodiment, an energy harvesting system has at least one power source and at least one power source monitor for monitoring a power parameter at the power source. At least one load is operably coupled to the power source and to a load monitor for monitoring a power parameter at the load. A control module uses the monitored parameters to control power supplied to the load by the power source.

According to yet another aspect of the invention, a preferred embodiment of an energy harvesting system includes a plurality of power sources each operably coupled to a corresponding circuit facilitating the control of power supplied to the load by each of the power sources.

The invention has advantages including but not limited to providing one or more of the following features, improved intermittent-source, e.g., solar, energy harvesting, increased energy harvesting efficiency, and reduced costs. These and other advantages, features, and benefits of the invention can be understood by one of ordinary skill in the arts upon careful consideration of the detailed description of representative embodiments of the invention in connection with the accompanying drawings.

BRIEF DESCRIPTION OF THE DRAWINGS

The present invention will be more clearly understood from consideration of the description and drawings in which.

References in the detailed description correspond to like references in the various drawings unless otherwise noted. Descriptive and directional terms used in the written description such as front, back, top, bottom, upper, side, et cetera; refer to the drawings themselves as laid out on the paper and not to physical limitations of the invention unless specifically noted. The drawings are not to scale, and some features of embodiments shown and discussed are simplified or amplified for illustrating principles and features as well at least some of the advantages of the invention.

DESCRIPTION OF PREFERRED EMBODIMENTS

While the making and using of various exemplary embodiments of the invention are discussed herein, it should be appreciated that the systems and methods exemplify inventive concepts which can be embodied in a wide variety of specific contexts. It should be understood that the invention may be practiced in various applications and embodiments without altering the principles of the invention. For purposes of clarity, detailed descriptions of functions, components, and systems familiar to those skilled in the applicable arts are not included. In general, the invention provides techniques, apparatus, and systems for power control and energy harvesting which may be implemented using integrated circuits (ICs) and/or printed circuit boards (PCBs). The invention is described in the context of representative exemplary embodiments. Although variations in the details of the embodiments are possible, each has one or more advantages over the prior art.

In applications wherein variations in temperature significantly affect performance, temperature compensation, such as adjustment of the reference voltage to an integrator, may be provided so that maximum power transfer is achieved over the full temperature range of operation. Like other semiconductor devices, solar cells are sensitive to temperature. Increases in temperature reduce the band gap of a semiconductor, thereby effecting most of the semiconductor material parameters. In a semiconductor-based photovoltaic solar cell for example, the parameter perhaps most significantly affected by an increase in temperature is the open-circuit voltage. The net effect is a reduction in the open-circuit voltage more-or-less linearly with increasing temperature. The magnitude of this reduction is inversely proportional to open circuit voltage; that is, cells with higher values of open circuit voltage suffer smaller reductions in voltage with increasing temperature. For silicon-based solar cells the reduction is about 0.15%/° C. to 0.5%/° C. or more, depending on the construction of the cell. Thus, for example, overall efficiency may be increased by adjusting the reference voltage of a voltage regulator in response to changes in solar cell temperature.

Figure 1:
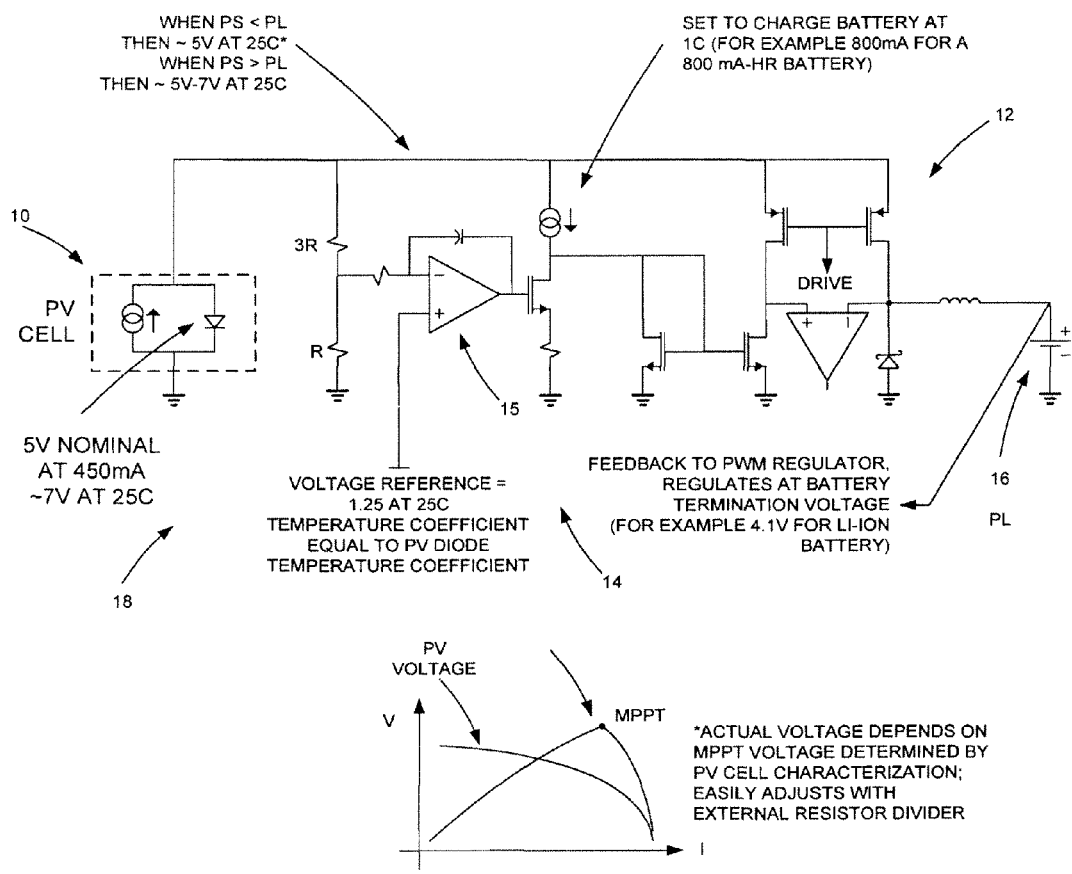
FIG. 1 is a simplified schematic diagram illustrating an example of preferred embodiments of circuits, systems, and methods of the invention.
Figure 2:
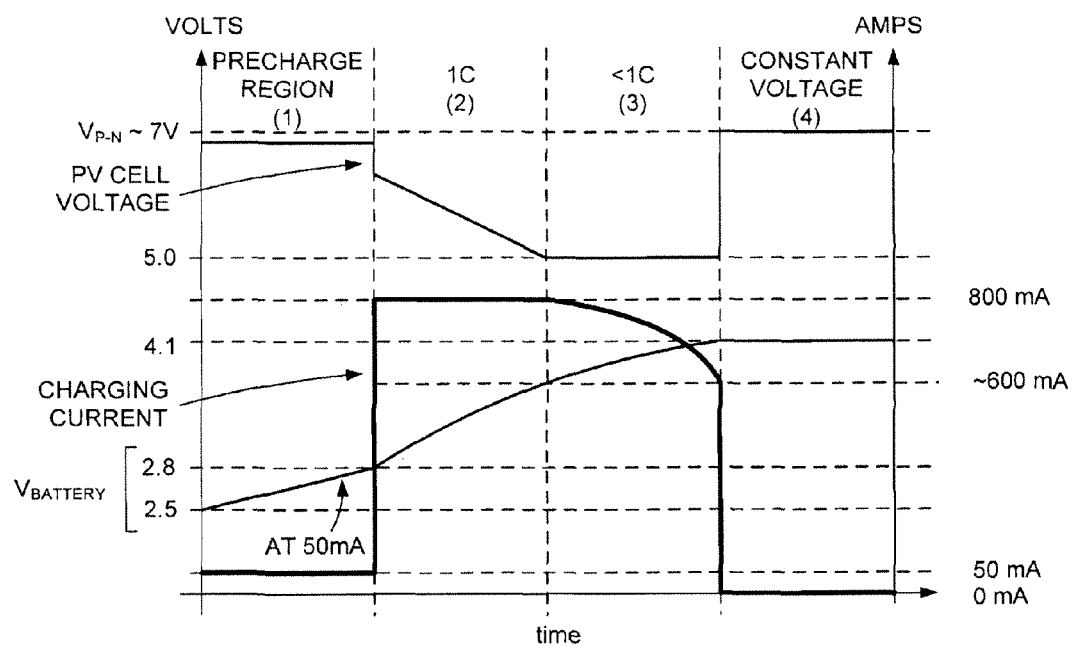
FIG. 2 is a graphical representation illustrating the operation of the embodiment of the invention introduced in FIG. 1.

Referring primarily to FIGS. 1 and 2, examples of structures and methods of preferred embodiments of the invention are described. A power source, in this example a photovoltaic cell or array 10, produces an output voltage PV. A regulator circuit 12, in this case a buck regulator shown in simplified form in the schematic, is operably coupled to the power source 10 and to a current limit adjustment circuit 14. The current limit adjustment circuit 14 preferably includes an amplifier configured as an integrator 15, as shown. The output of the buck regulator 12 is coupled with a load 16, preferably an energy storage medium, such as a rechargeable battery or capacitor. In operation, the circuitry shown in the example of FIG. 1 is adapted to function in at least two modes. Operation in a first mode occurs when the output power PV of the power source 10 is lower than the power PL required by the load 16. Operation in a second mode occurs when the output power PV of the power source 10, in this case a photovoltaic array, is greater than the power PL required by the load 16. Preferably, by changing the current and/or voltage level at the power source, power delivered to the load can be maximized for the prevailing conditions at the source. For example, under circumstances which cause a reduction of voltage at the power source, the current level can be adjusted to maintain the maximum power point, sometimes referred to in the art as MPPT (Maximum Power Point Tracking), at the most advantageous level for the conditions. This relationship is shown in the voltage/current graph inset of FIG. 1. This is preferably accomplished by monitoring one or more parameters reflective of the actual real-time performance of the circuit. In this way, the performance of the circuit is enhanced as conditions change, regardless of the cause of the change. For example, if a voltage drop occurs in a photovoltaic cell, the current level delivered to the load is adjusted, preferably by adjusting the reference level of a regulator module. The maximum power point is maintained irrespective of whether the voltage drop is caused by a shading of the cell, or increased operating temperature, or some other cause or combination of causes. Thus, there is no need for the use of independent sensors dedicated to monitoring lighting conditions, temperature, and so forth. The efficiency and performance of the system are enhanced, and the need to anticipate the specifics of potential performance problems is reduced.

FIG. 2 depicts an exemplary graphical representation of the current and voltage during the operation of the circuit illustrated in FIG. 1. For the purposes of this example, it is assumed that the source 10 is capable of providing a normal operating output voltage in the range of 5V-7V, at about 25 degrees centigrade, and that the other components are sized accordingly. It is also assumed that characterization of the power source 10, in this example a photovoltaic cell, has been performed and a reference voltage has been selected to correspond to maximum power transfer from the power source 10. In the first mode, when the power output PV of the source 10 is less than the power required at the load PL, the output of the power source 10 has a tendency to drop. However, when the output of the PV cell 10, divided by the resistive voltage divider (18 in FIG. 1) drops below the reference voltage the integrator 15 (1.25V in this example), the integrator 15 output voltage increases. This causes the current limit for the buck regulator 12 to decrease, which in turn permits the power source 10 output voltage PV to increase. When the integrator 15 reaches equilibrium, the voltage PV across the power source 10 is preferably regulated to the reference voltage level. Under these conditions, the power delivered to the load 16 matches the maximum power PV that can be provided from the power source 10, which is the preferred level. In FIG. 2, this is shown as within the 1C charging region, where the load receives the preferred charging current level, 8 mA at 4.5V. Under less ideal conditions, in which the power source 10 output PV drops below its maximum level, as shown in the FIG. 1 inset showing the voltage/current, the charging current level is maintained at a level to maximize the power output of the photovoltaic cell. This current is generally less than the ideal maximum possible charging current level, but is preferably the most efficient charging level under the existing conditions. It should be appreciated that the specific values used in this example are representative of a preferred embodiment and are not limitations of the invention.

Operating in the second mode, when the power source 10 output PV is greater than the power requirement PL of the load 16, the expected output voltage PV of the power source 10, in this example is 5V-7V, depending on the load current presented to the power source 10 by the buck regulator 12. Since the power PL demanded by the load 16 is less than what the power source 10 can deliver, the buck regulator 12 provides the full charging current. In FIG. 2, this is shown as the trickle charging region.

Figure 3:
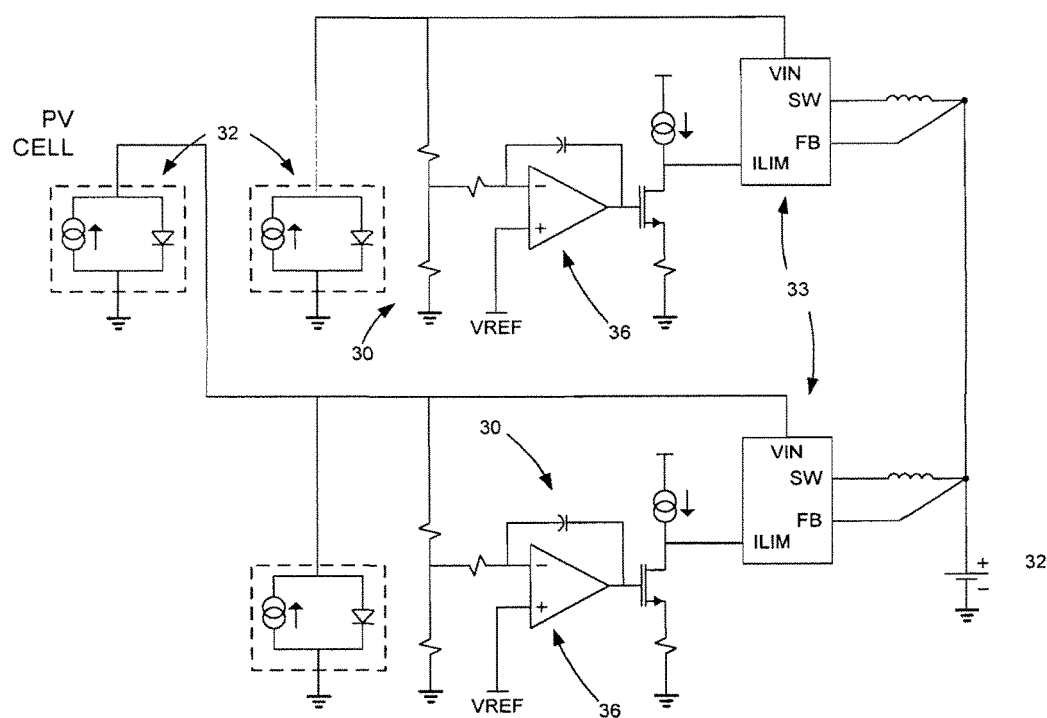
FIG. 3 illustrates a simplified schematic diagram illustrating an example of a preferred embodiment of a multi-source circuit, system, and method of the invention.

Alternative circuit arrangements are illustrated with reference to FIG. 3. In this example, a dual power source 32 is made up of two photovoltaic cells or arrays, or other sources, or combination of sources, for which variability of power-producing capability may be a concern. Examples of additional power sources that may be used advantageously with the invention include wind turbines, water turbines, piezoelectric power generators, regenerative braking power harvesting apparatus, and the like. Each power source 32 produces an output voltage PV1, PV2. Each is coupled to a current limit adjusting circuit 30 having an integrator component 36, such as an op amp as shown. Regulator circuits 38 are connected with the power sources 32 and the current limit adjustment circuits 30. The output of the regulators 38 are coupled with a load 34, preferably an energy storage medium, such as a rechargeable capacitor or battery. The circuitry shown in the example of FIG. 3 has the capability of causing each of the power sources 32 to operate in at least two modes, the first mode when the output power PVn of the individual power sources 32 is lower than the power PL required by the load(s) 34, and the second mode when the output power PVn capability of the power sources 32 is greater than the power PL required by the load(s) 32. Using multiple regulators 33 and current limit adjustment circuits 30 to allow independent control of multiple power sources 32 has particular advantages. In particular, in applications having a plurality of power sources, for example photovoltaic systems having multiple photovoltaic cells, in the event one cell is shaded, blocked, damaged, defective, or removed, for example, and does not produce power at a level similar to the other cells, the system will nevertheless continue to deliver as much power to the load 34 as possible. Although two power sources are shown in the example of FIG. 3, the principles of the invention apply to the use of any number of power sources, and the invention may be practiced with any number of multiple sources or arrays to the extent it is practical to do so in a given implementation. Due to the use of actual performance parameters to adjust MMPT, the systems, circuits, and methods shown and described may be particularly suited to implementations in which multiple energy harvesting techniques are used, as the need to separately monitor disparate potentially influential environmental factors, such as those specifically related to wind, solar, or thermal energy sources for example, may be reduced or eliminated.

The regulator, examples of which are shown in FIGS. 2 and 3, may alternatively include a boost, e.g. voltage-increasing, or buck-boost configuration instead of or addition to the shown buck configuration as drawn, depending on the power source voltage and load voltage. A buck-boost regulator configuration connects the input voltage source directly to the inductor while in an "on" state. This results in the accumulation of energy in the inductor. In this state, the capacitor supplies energy to the output load. While in the "off" state, the inductor is connected to the output load and capacitor, so that energy is transferred from the inductor to capacitor and the resistor. A mixed-signal implementation of an integrator/current control may also be realized by using a sigma-delta modulator (a switched-capacitor filtering circuit) to act as an integrator, and converting the analog into the digital domain. Then, a simple digital comparison may be done to arrive at the proper current limit value. Implementation of digital comparisons may also be used, such as for example a simple up-down counter, or a digital signal processor (DSP), general purpose microprocessor, field programmable gate array (FPGA), or application-specific integrated circuit (ASIC). An alternative configuration of the current limit adjustment circuit may be implemented by performing a true power calculation for either the power source or load. This requires the measurement of both voltage and current for either the power source or load. The load current adjustments may be made in response to the calculations such that the power source voltage corresponding to true maximum power transfer can be achieved. This alternative implementation may utilize analog, digital, or mixed-signal circuitry.

The systems and methods of the invention provide one or more advantages including but not limited to, energy harvesting efficiency, improved power control techniques and/or circuitry, and reduced costs. While the invention has been described with reference to certain illustrative embodiments, those described herein are not intended to be construed in a limiting sense. For example, variations or combinations of steps or materials in the embodiments shown and described may be used in particular cases without departure from the invention. Although the presently preferred embodiments are described herein in terms of particular examples, modifications and combinations of the illustrative embodiments as well as other advantages and embodiments of the invention will be apparent to persons skilled in the arts upon reference to the drawings, description, and claims.

We claim:

1. A circuit comprising:
   a photovoltaic cell;
   a first resistor coupled to the photovoltaic cell;
   a second resistor having a first lead coupled to the first resistor and a second lead coupled to ground;
   a third resistor having a first lead coupled to the first resistor and the second resistor;
   an integrator having a first input coupled to the third resistor and a second input coupled to a reference voltage;
   a capacitor having a first lead coupled to the first input of the integrator and a second lead coupled to an output of the integrator;
   a first transistor having a control terminal coupled to the output of the integrator, a first conducting terminal coupled to a current source and a second conducting terminal coupled to a fourth resistor;
   a second transistor having a control terminal and a first conducting terminal coupled to the first conducting terminal of the first transistor and a second conducting terminal coupled to ground;
   a third transistor having a control terminal coupled to the control terminal of the second transistor, a first conducting terminal coupled to ground and a second conducting terminal coupled to an operational amplifier;
   a fourth transistor having a first conducting terminal coupled to the current source and a second conducting terminal coupled to the operational amplifier;
   a fifth transistor having a first conducting terminal coupled to the current source, a second conducting terminal coupled to the operational amplifier and a control terminal coupled to a control terminal of the fourth transistor; and
   a diode coupled to the operational amplifier and the fifth transistor.

2. The circuit of claim 1 wherein the reference voltage comprises a temperature coefficient that is essentially equal to a temperature coefficient of the photovoltaic cell.

3. The circuit of claim 1 further comprising an inductor coupled to the diode, the inductor having a first terminal coupled to the diode and a second terminal coupled to a pulse wave modulator.

4. The circuit of claim 1 further comprising an inductor having a first terminal coupled to the diode and a second terminal coupled to a battery.

5. A method for controlling power in an energy harvesting system comprising the steps of:

receiving, at an integrator, at least one power parameter signal from a power source, the integrator having a first input coupled to the power source, a second input coupled to a reference voltage and an output coupled to a first input of a buck regulator;

receiving, at the buck regulator, at least one power parameter from a load operably coupled to the power source and to a second input of the buck regulator;

increasing a power source output by changing a signal provided at the output of the integrator when the at least one power parameter signal from the power source is lower than a predetermined threshold;

decreasing the power source output by changing the signal provided at the output of the integrator when the at least one power parameter signal from the power source is greater than a predetermined threshold; and generating a modulator feedback signal at the output.

6. The method of claim 5 comprising maintaining a charging current at a first level while increasing a battery voltage to a second level and maintaining a photovoltaic cell voltage at a third level.

7. The method of claim 6 comprising increasing the charging current to a fourth level while increasing the battery voltage from the second level to a fifth level and while linearly decreasing the photovoltaic cell voltage.

8. The method of claim 7 comprising decreasing the charging current from the fourth level to a sixth level while increasing the battery voltage from the fifth level to a seventh level while maintaining the photovoltaic cell voltage at an eight level.

9. The method of claim 8 comprising dropping the charging current to zero while maintaining the battery voltage at the seventh level and increasing the photovoltaic cell voltage to a ninth level.

10. A circuit comprising:
a first photovoltaic cell;
a first resistor coupled to the first photovoltaic cell;
a second resistor having a first lead coupled to the first resistor and a second lead coupled to ground;
a third resistor having a first lead coupled to the first resistor and the second resistor;
a first integrator having a first input coupled to the third resistor and a second input coupled to a first reference voltage;
a first capacitor having a first lead coupled to the first input of the first integrator and a second lead coupled to an output of the first integrator; and
a first transistor having a control terminal coupled to the output of the first integrator, a first conducting terminal coupled to a current source and a second conducting terminal coupled to a fourth resistor.

11. The circuit of claim 10 further comprising a first regulator coupled to the first transistor.

12. The circuit of claim 10 further comprising a second photovoltaic cell.

13. The circuit of claim 12 further comprising a fifth resistor coupled to the second photovoltaic cell.

14. The circuit of claim 13 further comprising a sixth resistor having a first lead coupled to the fifth resistor and a second lead coupled to ground.

15. The circuit of claim 10 further comprising a seventh resistor having a first lead coupled to the fifth resistor and the sixth resistor.

16. The circuit of claim 10 further comprising a second integrator having a first input coupled to the seventh resistor and a second input coupled to a reference voltage.

17. The circuit of claim 10 further comprising a second capacitor having a first lead coupled to the first input of the second integrator and a second lead coupled to an output of the second integrator.

18. The circuit of claim 10 further comprising a second transistor having a control terminal coupled to the output of the second integrator, a first conducting terminal coupled to a current source and a second conducting terminal coupled to an eighth resistor.

19. The circuit of claim 10 further comprising a second regulator coupled to the second transistor and the first regulator.

* * * * *

UNITED STATES PATENT AND TRADEMARK OFFICE
CERTIFICATE OF CORRECTION

PATENT NO.        : 9,722,420 B2                                  Page 1 of 1
APPLICATION NO.   : 13/874321
DATED             : August 1, 2017
INVENTOR(S)       : Ross Teggatz et al.

It is certified that error appears in the above-identified patent and that said Letters Patent is hereby corrected as shown below:

In the Claims

1. In Column 7, Line 31, in Claim 8, delete "eight" and insert -- eighth --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*